Nov. 11, 1969    P. A. DI CICCO    3,477,594
VEHICLE LOADING BIN
Filed July 5, 1967
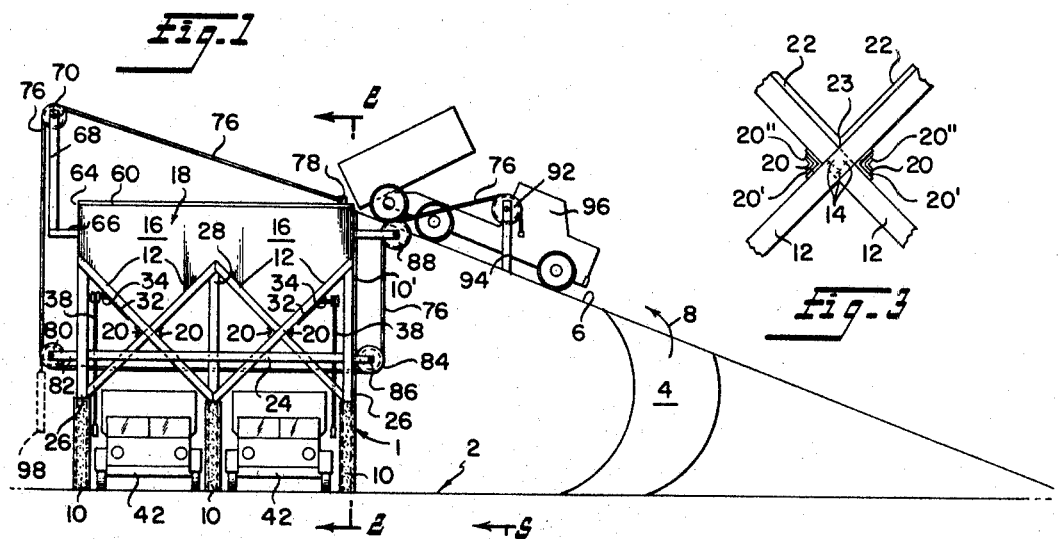
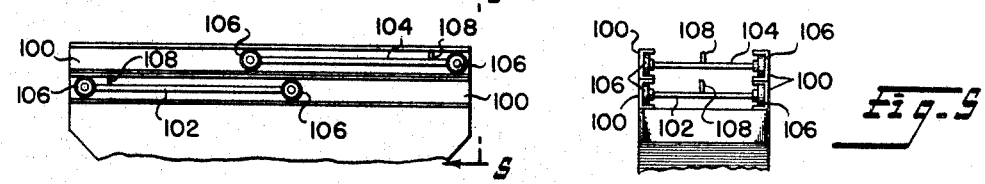
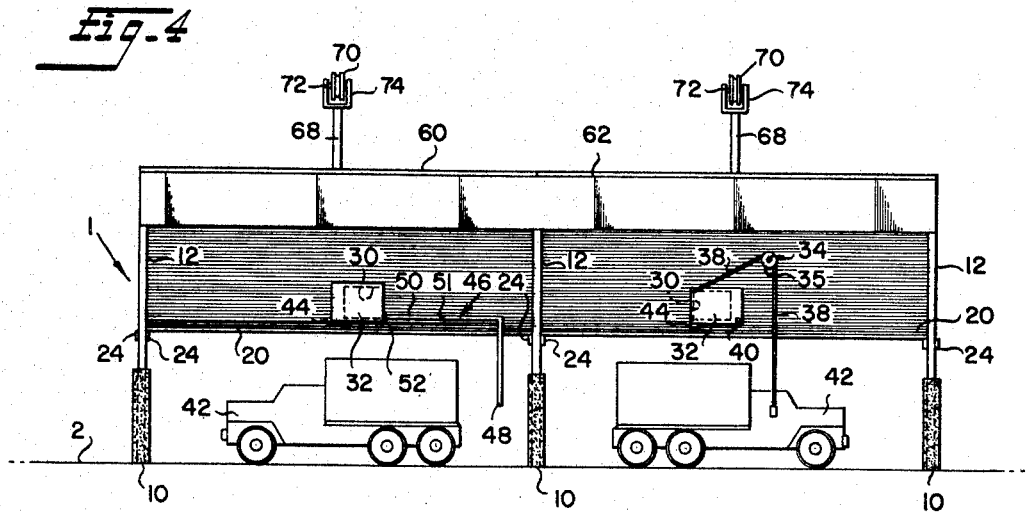
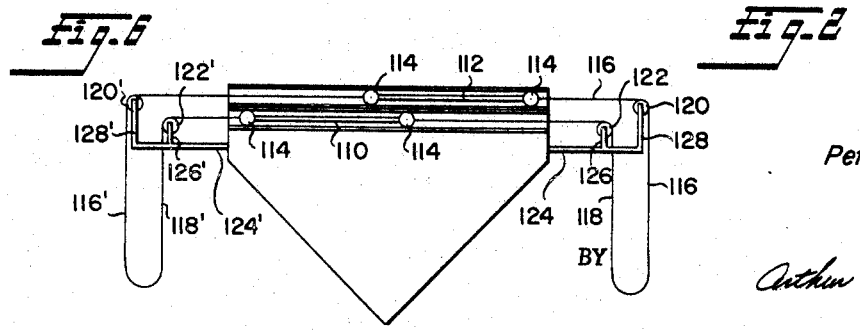
INVENTOR
Peter A. Di Cicco
BY Arthur Schwartz
ATTORNEY

United States Patent Office 3,477,594
Patented Nov. 11, 1969

3,477,594
VEHICLE LOADING BIN
Peter A. Di Cicco, 287 Grove St.,
Brockton, Mass. 02402
Filed July 5, 1967, Ser. No. 651,182
Int. Cl. B65g *67/04;* E04h *7/00*
U.S. Cl. 214—41        10 Claims

ABSTRACT OF THE DISCLOSURE

A vehicle loading bin having at least one generally V-shaped receptacle portion for receiving, retaining and dispensing of material into a vehicle, the bin having a door located on at least one side of the receptacle adjacent the two sides forming the V. Means are included for opening and closing the door, together with means for covering the receptacle. The bin is elevated to receive a plurality of trucks.

BACKGROUND AND OBJECTS

In the past, various types of devices have been proposed to load trucks and the like. Problems arise, particularly when different types of chloride material is to be loaded into a truck for dispensing along the streets and highways during the winter. If a mixture of material is to be used, in the past it has been customary to load the truck with individual sacks of material by hand, and if more than one type of material is to be mixed, then the men loading the vehicle must proportionately load the truck in accordance with the desired ratio of material to be used.

Various loading type devices have been proposed which include bin-shaped receptacles. These are, for the most part, rather complex and cumbersome in their use.

It is therefore an object of the instant invention to provide a relatively simple vehicle loading bin.

It is another object to provide a vehicle loading bin that is elevated on concrete reinforced members so that one or a plurality of trucks can be loaded simultaneously.

It is a further object to provide suitable cover means for the receptacle to keep the elements, such as rain, snow and dirt, from contaminating the material in the receptacle.

It is still another object to provide rigid reinforcing means for use with the vehicle loading bin to adequately support the bin from a structural standpoint.

It is another object to provide a roadway for a truck or the like to ascend to the top of the bin and load same.

It is another object to provide cover members in such an arrangement that they may be variously opened and closed to facilitate, not only the use of a loading truck, but also a crane having a bucket or the like for loading the receptacles.

Another object is to provide means for opening and closing the covers from a convenient location such as adjacent the loading truck or adjacent the ground.

A further object is to provide doors on one side of a generally V-shaped receptacle and means adjacent the ground for the vehicle operator to load his vehicle from the bins.

It is still a further object to provide a structurally sound and economical vehicle loading bin.

SUMMARY

The invention includes at least one V-shaped, and preferably a pair of V-shaped receptacle portions in the form of a vehicle loading bin elevated above the vehicles to be loaded. A door is provided adjacent the location where the truck will be located, to individually load a plurality of trucks at any given time. The doors for loading the trucks are preferably pivotally mounted and operable from the ground adjacent the trucks. A pair of cover members are provided for the receptacles so that they may be opened easily.

BRIEF DESCRIPTION OF THE DRAWINGS

The above and other objects and advantages of the invention will readily become apparent from the following detailed description, taken together with the drawings wherein:

FIGURE 1 shows a front elevation view of the vehicle loading bin, together with a roadway leading to the bin, with vehicles positioned in their appropriate locations;

FIGURE 2 is a side elevation view taken along lines 2—2 in FIGURE 1;

FIGURE 3 is a detail of the cross-section of the supporting beams;

FIGURE 4 is a fragmentary sectional view of one modification of the cover members on a bin;

FIGURE 5 is a side elevation view taken along lines 5—5 in FIGURE 4 showing that modification; and FIGURE 6 is a front elevation view schematically showing another means for operating the double covers of FIGURES 4 and 5.

DETAILED DESCRIPTION OF THE INVENTION

Referring now in detail to the drawings, particularly FIGURES 1 and 2, it will be seen that a vehicle loading bin 1 is supported on the ground 2 and includes a roadway means 4 leading up to an incline 6 adjacent the bin 1. The vehicles which load the bin will follow the arrows 8 up to the edge of the bid.

The bin can be mounted in an elevated position relative to the ground 2 by means of concrete supports 10. These supports may be positioned along the length of the bin or may actually be one or more continuous supports which extend a substantial length along the bin. The number and location will depend upon the number of cross-sectional members as discussed below. Also, a retaining wall 10′ is positioned to hold back the earth of incline 6.

Mounted on the concrete support 10 are a plurality of heavy cross-sectional pieces 12. As seen in FIGURE 3, the cross-sectional pieces include a plurality of rivets, bolts or the like 14 connecting each of the pair of cross-sectional pieces 12 together. Since there may be, for example, two, three or more cross-sectional pieces 12 which support a V-shaped receptacle portion 16 of a hopper or bin portion 18, these cross-sectional pieces 12 may be connected by a plurality of right angle irons 20. Additional right angle irons 20′ and 20″ are inserted as shown to add rigidity. The lower portion of the V-shaped receptacle portions 16 include side members 22 as seen in detail in FIGURE 3 which meet at a point 23, all of which rest on the cross members 12. The bin, as seen in FIGURE 1 is actually W-shaped to accommodate a plurality of vehicles simultaneously.

Also supporting the bin 18, and specifically the V-shaped portion 16 may be another horizontally extending member 24. This cross member, together with the cross members 12 are suitably connected to outside vertical members 26 and a central vertical member 28 which assist in supporting the bin.

DOOR MEMBERS

The bin portions are provided with a plurality of openings 30 adjacent the juncture of one of the walls of the sides which make up the V-shaped member. An equal number of doors 32 are pivotally mounted in various fashions over openings 30.

As seen in FIGURE 1 and the righthand portion of FIGURE 2, a member 34 extends outwardly from the bin. Attached to the outwardly extending member 34 is a pulley 35. At one point 36 on the door a cable member 38 is attached. The cable then goes over the pulley 35 and downwardly adjacent the door of the truck for example.

It will be seen that in this fashion the door will pivot around a point 40 when the cable 38 is pulled downwardly. This will open the door 32 over opening 30 on the bin and allow material to flow into one of a plurality of vehicles 42. When the cable is released, the weight of the door 32 will close the opening 30 and be stopped by a member 44.

Another embodiment of the invention is seen in FIGURE 2 on the lefthand side where an L-shaped rod 46 extends rearwardly from a door 32 and downwardly by means of one leg 48 of the L 46. The other leg 50 of the L 46 has a pivot 51 intermediate the leg 50 between its juncture with leg 48 and a juncture 52 with the door 31. Instead of being positioned adjacent the door of the truck, the operating member is thus located to the rear of the truck. Therefore, since pivot point 51 actually extends horizontally outward somewhat from the bin, a downward pull on leg 48 will pivot the leg L and connect a door member 32 around pivot point 51, thus raising the door. Material will flow into the truck in the same manner as discussed above.

When the leg 48 is allowed to go upward by the weight of the door 32 or pushed upward, the opening in the V-shaped receptacle portion 30 will be closed. Again, the door will abut against a stop member 44.

As is seen above, two types of pivoted operators are provided on the receptacle bin, the more desirable being used in any given situation.

COVER MEMBERS

Several types of cover members and operating devices may be utilized. The first modification is seen in FIGURES 1 and 2. A pair of doors 60 and 62 as seen in FIGURE 2 are pivotally connected at a rear point 64. Connected to the rear portion of the bin is a cross piece or connecting member 66 extending horizontally. Vertically connected to member 66 is a second member 68 having a pulley 70 thereon. The pulley may be connected through an axle 72 on a U-shaped member 74 as seen in FIGURE 2.

A cable 76 connects to the front portion of the cover at a point 78. The cable 76 extending over pulley 72 extends downwardly to another pulley 80 which is positioned in a similar manner on an outwardly extending piece 82. The cable 76 then may move under the bin to a third pulley 84 connected in a similar fashion to an outwardly extending member 86. The pulley 76 continues upwardly to a fourth pulley 88 which is mounted on another outwardly extending member 90 in a similar fashion as members 82 and 86. The cable then goes over a final pulley member 92 mounted on an upright 94 on the incline 6. The operator of a truck 96 can pull on the end of the cable 76 and through the pulley and cable means raise open the door sufficiently to allow for the material in truck 96 to empty itself into the receptacles.

It will be appreciated that the incline 6 will be wide enough or additional inclines will be provided so that the truck may move over and empty into the bin portion having the cover 62 thereover.

Also, or alternately, a member 98 may extend down from cable 76 to a point adjacent the ground where the cover may be operated from the ground without going the extensive distance. This downwardly extending portion 98 may be either in lieu of the portion of the cable 76 which extends around pulleys 84, 88 and 92 or may be in addition thereto. If both are utilized, additional versatility is provided.

MODIFICATIONS OF THE COVER OF FIGURES 4, 5 AND 6

As seen in FIGURES 4 and 5 a pair of U-shaped members 100 are adapted to receive a pair of doors 102 and 104, the remainder of the receptacle being the same.

The doors 102 and 104 are mounted on a plurality of wheels 106 and each have a handle number 108 for sliding them open relative to each other. It will be noted that these doors 102 and 104 slightly overlay so that no foreign material or moisture can get into the receptacles.

It will be obvious that by sliding the door with use of the handle 108 over or under the other door, one portion of the receptacle may be opened while the other portion remains closed. The difference between the modification of FIGURES 4 and 5 and that previously discussed in relation to FIGURES 1 and 2 is the fact that the receptacle portions 16 may be separately obtained access to rather than a double portion of receptacle or bin 18 being opened as in FIGURES 1 and 2.

The modification in FIGURE 6 discloses a single V-shaped receptacle portion as opposed to a double V of FIGURE 1 wherein similar doors are used with a pulley arrangement. A pair of doors 110 and 112 are positioned in the same manner on rollers 114. Connected to one side of the doors 110 and 112 is a cable portion 116 and a cable portion 118. These go over pulley members 120 and 122 respectively.

The pulleys are mounted on a frame member 124 having upward portions 126 and 128 connected to pulleys 122 and 120, respectively.

By pulling on cable 118 the door 110 will slide to the right. If the door 112 were to be to the left, it could be closed by pulling cable 116 pulling the door 112 to the right over the pulley 120.

A similar arrangement with similar numbers having primes thereafter, hence 116′–128′ is seen on the left side of the bin in FIGURE 6. The operation of the left side being the same as the right thus opening the receptacle covers and closing same from both sides of the bin.

While the invention has been described, it will be understood that it is capable of further modification and this application is intended to cover any variations, uses, or adaptations of the invention following in general the principles of the invention, and including such departure from the present disclosure as come within the knowledge or customary practice in the art to which the invention pertains.

What is claimed is:
1. A vehicle bin comprising:
   (a) at least one generally V-shaped receptacle portion for receiving, retaining and dispensing material into the vehicle,
   (b) a door located on a side of said receptacle near the juncture of the two sides of said V,
   (c) at least one pair of X-shaped means forming a cradle for supporting said V-shaped receptacle portion, said V-shaped receptacle portion resting within said cradle,
   (d) means for connecting said X-shaped members at their cross-over point, and
   (e) a plurality of leg supports, said pair of X-shaped means positioned between said leg supports,
   (f) cover means on the top of said generally V-shaped receptacle portion, said cover means comprising:
      (1) a pair of U-shaped members,
      (2) a pair of doors adapted to be received and slidable within said U-shaped members, and
      (3) means adapted for opening and closing said pairs of doors such that in their closed position, said doors overlap.
2. A vehicle loading bin as defined in claim 1 in which:
   (a) said generally V-shaped receptacle portion is elevated a distance above the ground and includes means to receive a pair of vehicles under said portion, and

(b) said door includes pivoting means for opening same, said pivoting means including an end portion located adjacent a vehicle.

3. A vehicle loading bin as defined in claim 2 further comprising a roadway means leading to said cover means.

4. A vehicle bin as defined in claim 3 in which said pivoting means comprises pulley means and a pivot point remote from said roadway means.

5. A vehicle bin as defined in claim 1 wherein said means adapted for opening and closing said pairs of doors comprise handle means.

6. A vehicle bin as defined in claim 5 wherein said handle means further comprises a cable and pulley means.

7. A vehicle loading bin as defined in claim 1 wherein said V-shaped receptacle portion is elevated a distance above the ground wherein means is provided for receiving the vehicle.

8. A vehicle loading bin as defined in claim 7 including means for receiving at least one pair of vehicles.

9. A vehicle loading bin as defined in claim 8 wherein said receiving means includes means for receiving four vehicles simultaneously.

10. A vehicle loading bin as defined in claim 1 including a pair of said V-shaped receptacle portions forming a receptacle having a W-shaped bottom.

References Cited

UNITED STATES PATENTS

| | | | |
|---|---|---|---|
| 1,517,430 | 12/1924 | Johnson | 214—41 X |
| 1,576,940 | 3/1926 | Warner | 52—194 |
| 1,630,605 | 5/1927 | Butler | 214—41 X |
| 2,551,263 | 5/1951 | Gribble | 214—38 X |

FOREIGN PATENTS 85,881  7/1955  Norway.

ROBERT G. SHERIDAN, Primary Examiner

U.S. Cl. X.R.

52—194, 197